(No Model.)
C. W. PINKNEY.
GOVERNOR FOR STEAM AND OTHER ENGINES.
No. 339,462. Patented Apr. 6, 1886.
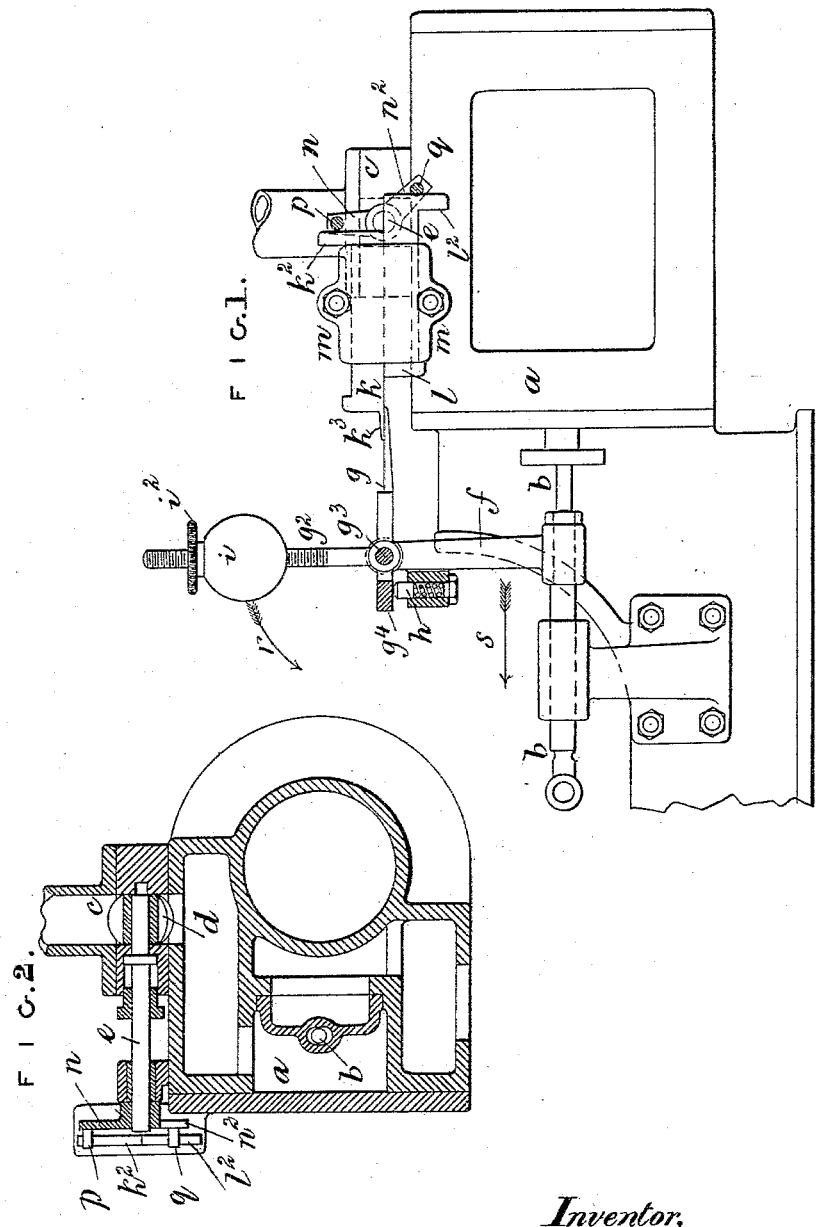
Witnesses,
Richard Skerrett
Arthur J. Powell.
Inventor,
Charles William Pinkney

UNITED STATES PATENT OFFICE.

CHARLES WILLIAM PINKNEY, OF SMETHWICK, COUNTY OF STAFFORD, ENGLAND.

GOVERNOR FOR STEAM AND OTHER ENGINES.

SPECIFICATION forming part of Letters Patent No. 339,462, dated April 6, 1886.

Application filed October 26, 1885. Serial No. 180,992. (No model.) Patented in England January 21, 1885, No. 878, and in France October 9, 1885, No. 171,564.

*To all whom it may concern:*

Be it known that I, CHARLES WILLIAM PINKNEY, of Smethwick, in the county of Stafford, England, a subject of the Queen of Great Britain, have invented Improvements in Governors for Steam-Engines and Compressed-Air Engines, (for which I have made application for Letters Patent in Great Britain, No. 878, dated January 21, 1885,) of which the following is a specification.

My invention consists in constructing and arranging, in the manner hereinafter described, the parts of governors for steam-engines and compressed-air engines, whereby great simplicity in construction and efficiency in action are secured.

I will describe my invention in connection with a horizontal steam-engine.

To the valve-rod or spindle of the engine (which said valve-spindle has a reciprocating motion given to it, as is well understood) I fix a nearly-vertical bracket, to the top of which a bell-crank lever is jointed, one of the arms of the said lever when it is in its normal position being vertical and the other horizontal. The normal position of the lever is maintained with a certain degree of force by means of a spring or springs. The vertical arm of the lever carries a bob or weight capable of being fixed at any desired height on the said arm. The horizontal arm of the said lever acts on two horizontal slide bolts in the following manner: The said slide-bolts slide upon one another. Each of the sliding bolts has a projecting vertical arm on its front end, the arm on the upper sliding bolt projecting upward, and that on the lower arm projecting downward. The axis of the throttle-valve is in the same horizontal plane as the contact-faces of the sliding bolts.

On the end of the axis of the throttle-valve is a lever, the two branches of which are nearly in the same line, each branch having a pin, which pins engage, respectively, behind the arms on the sliding bolts. The upper sliding bolt has at its front end a horizontal projecting lip, forming a continuation of its lower face.

The action of the parts is as follows: When the engine is running at a rate not exceeding that which, by the adjustment of the bob or weight, is decided on as the normal rate, the to-and-fro motion of the valve-spindle does not occasion any motion of the cranked lever upon its center. When, however, the motion of the engine exceeds its normal motion, the inertia of the bob causes it, when the motion is reversed, to lag behind, and the cranked lever turns upon its center. The end of the horizontal arm is thereby raised when the valve-spindle and bob are moving toward the throttle-valve, and the end of the horizontal arm of the cranked lever at the end of its stroke rests upon the projecting lip of the upper sliding bolt, and pushing that sliding bolt forward turns the axis of the throttle-valve, and thereby closes the said valve more or less and reduces the speed of the engine. The pushing back of the upper sliding bolt produces the advance of the lower sliding bolt. By the slackened speed of the engine the horizontal arm no longer engages on the lip of the upper sliding bolt, but at its lower position its end is opposite the end of the lower sliding bolt, and acts upon it, if the speed of the engine becomes reduced; hence by the action described on the upper and lower sliding bolts, the position of the throttle-valve becomes adjusted so as to maintain the normal speed of the engine.

Figure 1 of the accompanying drawings represents in side elevation a portion of a horizontal steam-engine to which a governor constructed according to my invention is applied, and Fig. 2 is a cross-section of the same, taken through the cylinder and throttle-valve and parts of the governor.

The same letters of reference indicate the same parts in both figures.

$a$ is the case of the slide-valve of the engine, and $b$ is the rod or spindle of the slide-valve, having a reciprocating motion effected in the ordinary way.

$c$ is the case of the throttle-valve $d$, and $e$ is the spindle of the said throttle-valve.

The governor constituting my invention consists of the following parts: On the slide-valve spindle $b$ a vertical bracket, $f$, is fixed and jointed. To the top of the said bracket is the bell-crank lever $g$ $g^2$, turning on the center $g^3$. When the said lever $g$ $g^2$ is in its normal position, as represented in Fig. 1, the arm $g^2$ is vertical, and the other arm, $g$, is horizontal. The normal position represented of the lever $g$ $g^2$ is maintained by the spring-bolt $h$, carried by the bracket $f$ bearing against the heel $g^4$ of the said lever. The vertical arm $g^2$ of the cranked lever is screw-threaded and carries a bob or weight, $i$, capable of being adjusted at any desired height on the said arm $g^2$ by the screw-nut $i^2$, on the top of the said bob working upon the screw of the vertical arm.

$k$ $l$ are the two horizontal sliding bolts working in the guides $m$ $m$, the lower edge of the top bolt, $k$, sliding upon the top edge of the under bolt, $l$. The horizontal arm $g$ of the cranked lever $g$ $g^2$ acts upon the said bolts $k$ $l$, in the manner hereinafter described. The front end of the horizontal arm $g$ of the cranked lever is pointed, and the rear end of the top sliding bolt, $k$, is furnished with a lip, $k^3$, for the pointed end of the arm $g$ to engage with. The sliding bolts $k$ $l$ have projecting vertical arms $k^2$ $l^2$ on their front ends, the arm $k^2$ of the upper sliding bolt projecting upward and the arm $l^2$ of the lower sliding bolt projecting downward. (See Fig. 1.) The axis $e$ of the throttle-valve $d$ is situated at right angles to the sliding bolts $k$ $l$, and is in the same horizontal plane as the contact-faces of the sliding bolts. $n$ $n^2$ is a lever on the end of the throttle-valve axis $e$, the branches of the said lever making a very obtuse angle with one another. Each branch of the lever is provided with a pin, $p$ $q$, which pins engage, respectively, behind the arms $k^2$ $l^2$ on the sliding bolts $k$ $l$. (See Fig. 2.)

The action of the parts of the governor is as follows: On the engine running at a rate exceeding that which by the adjustment of the bob or weight is decided on as the normal rate, the to-and-fro motion of the slide-valve spindle $b$ does not occasion any motion of the cranked lever $g$ $g^2$ upon its center $g^3$, and the throttle-valve $d$ is unoperated upon. When, however, the rate of motion of the engine exceeds its normal rate, the inertia of the bob $i$ causes the said bob when the motion of the slide-valve spindle is reversed, to lag behind. For example, when the slide-valve spindle $b$ has completed its stroke in the direction of the arrow $s$, Fig. 1, and begins its return-stroke, the bob $i$, lagging behind, performs a vertical motion on its center $g^3$ in the direction of the arrow $r$, Fig. 1. The pointed end of the horizontal arm $g$ of the cranked lever $g$ $g^2$ (which pointed end in the supposed position of the slide-valve spindle $b$ is clear of the lip $k^3$) is thereby raised, and as the valve-spindle $b$ and bob $i$ move toward the throttle-valve, or in a direction contrary to that indicated by the arrow $s$, the pointed end of the horizontal arm $g$ of the cranked lever as it approaches the end of its stroke rests upon the projecting lip $k^3$ of the upper sliding bolt, $k$, and pushes the said bolt $k$ forward. The arm $k^2$ of the said bolt $k$ is thereby made to operate upon the pin $p$, and through the arm $n$ move the axis $e$ of the throttle-valve through a small angle, and thus close the throttle-valve $d$ more or less and reduce the speed of the engine. The pushing back of the upper sliding bolt, $k$, produces the advance of the lower sliding bolt, $l$, through the action of the pin $q$ of the lower branch, $n^2$, of the lever $n$ $n^2$ upon the projecting arm $l^2$ of the said lower bolt, $l$. When, by the partial closing of the throttle-valve $d$ the engine has resumed its normal speed, there is no longer any lagging of the bob $i$, and the pointed end $g$ of the cranked lever $g$ $g^2$ now engages under the lip $k^3$, and no longer operates upon the sliding bolt $k$. The end $g$ of the lever in its lowered position is now opposite the end of the lower sliding bolt, $l$, and should the speed become reduced beyond the normal speed the pointed end of the lever $g$ strikes the end of the said bolt $l$, which bolt, as before described, has been pushed forward by the partial closing of the throttle-valve. The back motion thus given to the lower bolt, $l$, causes it to operate upon the axis of the throttle-valve through the arm $l^2$, pin $q$, and arm $n^2$, and reopen the said throttle-valve, and the parts of the governor resume the normal positions represented in the drawings. Thus by the action of the upper and lower sliding bolts, $k$ $l$, automatically operated upon by the cranked lever carried by the reciprocating slide-valve spindle, the position of the throttle-valve $d$ becomes adjusted, so as to maintain the normal speed of the engine, as will be understood by an examination of the drawings.

My invention is applicable to all kinds of vertical as well as horizontal steam-engines and compressed-air engines.

In applying my invention to vertical steam-engines and to compressed-air engines the parts of the governor are constructed, combined, and made to operate substantially in the manner hereinbefore described and illustrated with respect to a horizontal steam engine.

Having now particularly described and ascertained the nature of my said invention, and in what manner the same is to be performed, I declare that I claim as my invention of improvements in govornors for steam-engines and compressed-air engines—

1. In a governor for steam and other engines, the combination, with the reciprocating valve-rod $b$, of the bracket $f$, carrying the pivoted bell-crank lever $g$ $g^2$, one end of which engages with the lip $k^3$ on the sliding bolt $k$, the heel $g^4$, and spring-bolt $h$, substantially as described.

2. In a governor of the construction shown, the two sliding bolts $k\ l$, operated upon by the horizontal arm of the cranked lever $g\ g^2$, for automatically closing and opening the throttle-valve of the engine, the said bolts operating upon branches of a lever on the axis or spindle of the throttle-valve, substantially as hereinbefore described, and illustrated in the accompanying drawings.

CHARLES WILLIAM PINKNEY. [L. S.]

Witnesses:
RICHARD SKERRETT,
ARTHUR J. POWELL.